April 19, 1938.   A. E. FROLANDER   2,114,485
SEALED OIL FILTER PACKAGE
Filed Aug. 12, 1935
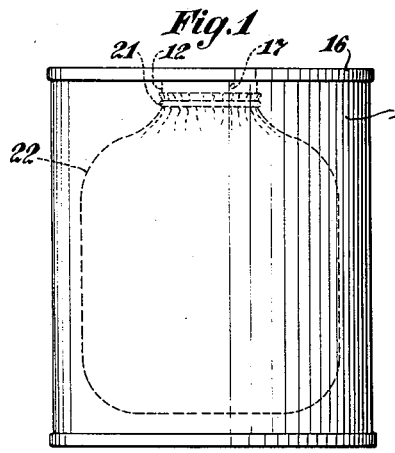
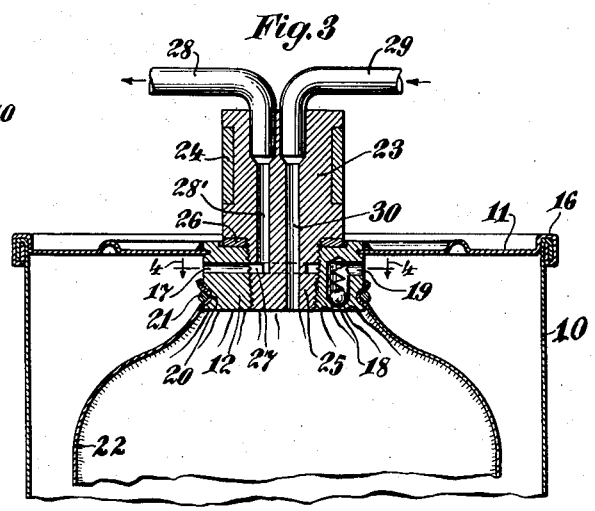
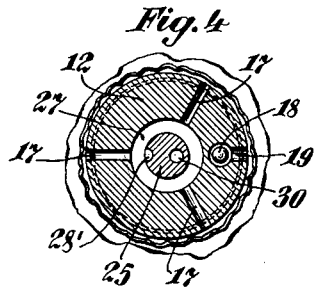
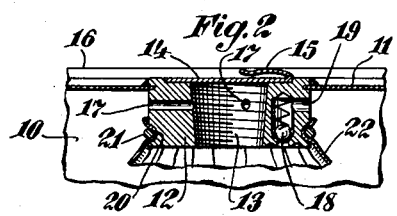
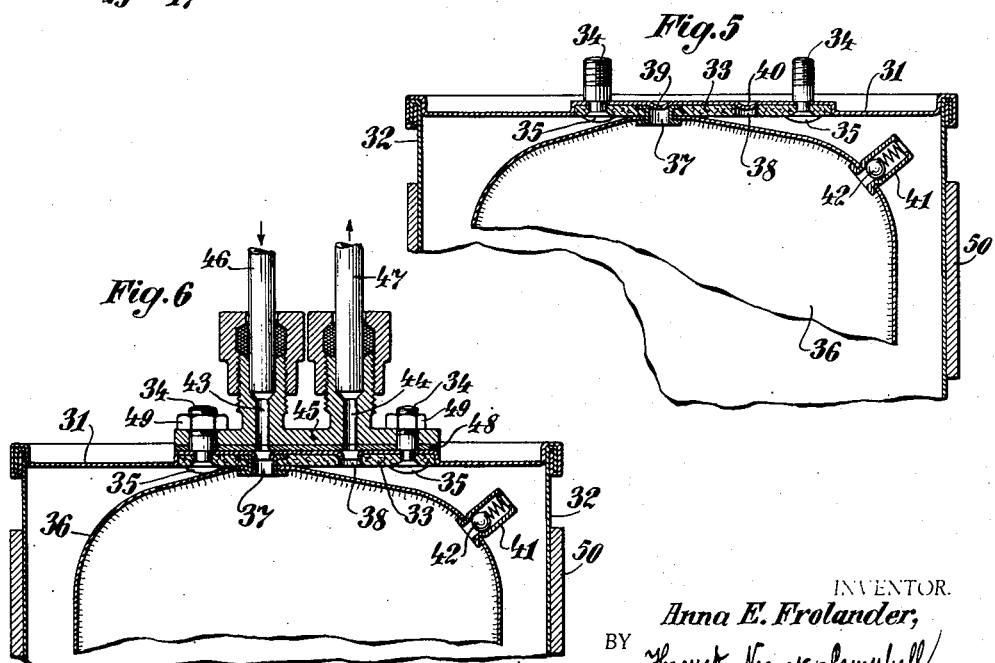
INVENTOR.
Anna E. Frolander,
BY Hoguet, Neary & Campbell,
HER ATTORNEYS Patented Apr. 19, 1938

2,114,485

UNITED STATES PATENT OFFICE 2,114,485

SEALED OIL FILTER PACKAGE

Anna E. Frolander, Elizabeth, N. J.

Application August 12, 1935, Serial No. 35,731

8 Claims. (Cl. 210—164)

This invention relates to oil filters and has particular reference to a sealed package containing a filter and a quantity of pure oil.

The majority of automobiles are now equipped with filters for abstracting from the oil the solid particles that are introduced through the intake of the carburetor in the form of grit and dirt and also those that are formed during the operation of the engine as a result of the combustion and disassociation of the oil by heat and which take the form of hard and soft carbon flakes. These filters are normally rated at from eight to ten thousand miles capacity but in the average car the filter cake forms rapidly, so that when the car has operated from three to five thousand miles the filter has lost much of its effectiveness.

Due to a general misconception of the effectiveness of a filter it has been assumed by many users that the removal of solid particles renews the oil, when as a matter of fact it is not the solid matter that decreases the lubricating properties of the oil, but it is the liquid diluents such as gasoline, water and the light fractions introduced by breaking down of the oil. Accordingly, the charge of oil in the crank case of the engine should be changed more frequently than is indicated by the use of such a filter because during the winter time the oil becomes diluted by gasoline introduced by excessive choking of the engine, in the summertime the oil breaks down a great deal more rapidly because of excessive heating of the engine, and water is always present in the air and as a product of combustion. This popular misconception of the function of a filter has established much resistance to the changing of the oil at the proper time, despite efforts of the oil distributing agencies to correct that impression, so that, as the result, the engine and other bearing surfaces of the automobile are improperly lubricated for a large percentage of their operating time. The solution of this problem is to place the filter under the control of the oil distributing agencies, rate the filter at a reasonable mileage, and employ the filter rating as a standard to determine the time that the oil should be changed.

Until they are used, the filters remain open to the atmosphere, and acquire a considerable amount of moisture due to condensation on the interior of the container and other parts which frequently results in rusting of the metal and deterioration of the filter bag at points of contact with the rusting metal. Oil for lubricating automobile engines and the like is now marketed in sealed metal containers which are opened at the time that the oil is to be introduced into the crank case of the engine to insure that the user obtains new and pure oil of the rated grade.

It is proposed herein that the filter and the oil package be combined in a single sealed unit, whereby many new advantages and economies result.

In accordance with the present invention a sealed oil filter package is provided in which the filter bag is contained in a hermetically sealed container filled with a measured quantity of pure oil and openable at the time that the oil is to be introduced into the crank case of the engine, this filter container being insertable in the oil line leading from the oil pump to the bearings and crank case of the engine in the place usually occupied by the standard filter. In this way the filter bag is prevented from deteriorating and the filter is under the control of the oil distributing agency which determines the time that the filter is to be changed instead of relying on the operator's judgment as to the capacity of the filter and as to the time when the oil is to be changed as the result of the use of a filter.

More particularly, the oil filter package of this invention comprises a container constructed in the manner of the sealed oil packages now in general use and having within it a filter bag rated at from one to two thousand miles capacity with an effective area not greater than the superficial area of the container. The filter bag is secured to and suspended from a nipple secured to the top of the container and having a pipe connection which is sealed flush with the surface of the container by means of a frangible disc or a removable seal closure. The pipe connection communicates with the interior of the bag at one point and with the interior of the container outside of the bag at another point. Adapted to be screwed into this pipe connection so as to support the container, is a fitting communicating with the intake pipe leading from the oil pump and with the outlet pipe leading from the container to the bearings and/or crank case of the engine. Connections are provided in the fitting for registry with the passage in the nipple leading to the interior of the bag and with the passage in the nipple leading to the interior of the container outside of the bag. In this way, merely by screwing the nipple of the container into the fitting, communication between the intake pipe and the interior of the bag and between the outlet pipe and the interior of the container is automatically effected.

In an alternative form of the invention, the thin sheet metal head of the container is adapted to be perforated in two indicated places with a sharp instrument and bolted to a bed plate having oil intake and outlet connections registering with the perforations in the container. The oil inlet communicates with the interior of the filter bag and the outlet with the interior of the container exterior of the bag.

It will be seen that with the oil filter package of this invention, a filter with a rated life relatively equal to the normal rated period of usefulness of the new oil in the crank-case is substituted for the usual oil filter; it already contains a quart, or more or less, of pure oil which is required by any filter of corresponding size; the new oil filled into the crank-case is not polluted by any residue of old oil from an old filter or by the sludge from a leaking or broken old filter; the filter and the oil changing time are under the control of the proper agency, and the oil is kept in condition to give the most useful service. Also, the filter bag is protected in the oil against deterioration before use, the replacement of the filter is readily and quickly accomplished, and the cost to the user is negligible.

For a more complete understanding of the invention, reference may be had to the accompanying drawing, in which Figure 1 illustrates the sealed oil filter package of the invention;

Fig. 2 is an enlarged section through the nipple in the head of the package;

Fig. 3 illustrates the manner of mounting the device in use;

Fig. 4 is a transverse section through the filter as seen along the line 4—4 of Fig. 3;

Fig. 5 illustrates an alternative form of the sealed filter package of the invention; and Fig. 6 illustrates the manner of mounting it in use.

Referring to Fig. 1 of the drawing, numeral 10 designates the hermetically sealed container of sheet metal of a size to contain one or more quarts of pure lubricating oil of one of the rated grades, the container 10 in all essential respects resembling the conventional oil package, even to the flat top whereby they may be stacked one upon the other.

Sealed oil-tightly in an opening in the top 11 of the container 10 is a nipple 12 having a central pipe-threaded opening 13 communicating with the interior of the container 10 (Fig. 2). Opening 13 is hermetically sealed by a sheet metal closure disc 14 lightly soldered or otherwise secured in a recess in the surface of nipple 12 and fitted with a tongue 15 adapted to provide a purchase for pliers or a key to enable closure disc 14 to be removed to open the container 10. Frangible or other tamper-proof forms of closure may be employed with equal facility. The upper surface of nipple 12 and closure disc 14 lie either flush with or below the upper edge of flange or chime 16, so that the container 10 may be readily stacked (Fig. 2).

Nipple 12 is provided with several radial passages 17 communicating with opening 13 (Fig. 4). A ball valve 18 in a by-pass 19 connects the lower surface of nipple 12 with the edge thereof (Fig. 2). The edge of nipple 12 below the radial passage 17 is provided with an annular groove 20 in which is secured by wire 21 the upper end of a filter bag 22, which hangs suspended within the container 10 so as to occupy the greater proportion of its volume and which has an effective filtering surface somewhat less in area than the superficial area of the container 10.

The filter bag 22 is sewn from napped cotton cloth of sufficient density to filter the usual solids from the oil, the nap being on the intake or inside of the bag. The open upper end of the bag 22 is drawn closed around nipple 12 by wire 21 and its interior communicates directly with opening 13 and with by-pass 19 when ball valve 18 is unseated. Inasmuch as the container 10 is filled with pure oil, the filter bag 22 is immersed in the oil and is protected thereby.

Because of the oil and the seal 14, accumulation of moisture due to condensation with consequent rusting of the interior surfaces of the container or other interior parts thereof, is prevented and there is no resultant deterioration of the filter bag 22.

A fitting 23 secured to the front of the dash, the engine or the like by means of bracket 24, is provided with a pipe-threaded plug 25 adapted to be screwed into opening 13 in nipple 12 over gasket 26. An annular groove 27 in the plug 25 registers with passages 17 in nipple 12 when the plug 25 is screwed tightly into nipple 12 in the manner illustrated in Fig. 3. An eccentrically located passage 28' leads through fitting 23 from annular groove 27 to pipe 28 soldered in a recess in fitting 23 and leading to the crank-case or bearings of the engine. A second pipe 29 leading from the oil pump and soldered in a recess in fitting 23 leads through passage 30 into the interior of filter bag 22.

In operation, when it is desired to renew the filter, the used filter with its container 10 is unscrewed from fitting 23 by rotating the former in the proper direction and is discarded with its contents of sludge and unclean oil. A new package 10 containing oil of the proper grade, is prepared for use by removing sealing disc 14 with pliers or a key applied to tongue 15 and the entire container is screwed upwardly on fitting 23 so that the latter supports the container 10.

In this way, the old oil removed from the system when the used filter was discarded is replaced by new oil in container 10 and a new filter is placed in commission without special effort. The act of screwing the container 10 in place over gasket 26 automatically places the interior of the filter bag 22 in communication with the inlet pipe 29 and passage 30, and the interior of the container 10 outside of the bag 22 in communication with the outlet pipe 28 through radial passages 17, annular groove 27 and passage 28'.

Accordingly, as oil is pumped by the oil pump through pipe 29, it is filtered through bag 22 into the container 10 and flows out through pipe 28, the solid particles remaining within the bag 22. If the filter is not removed at the proper time and clogs, the increased pressure within the bag 22 unseats ball valve 18 so that oil is by-passed through 19 around the filter bag 22. The by-pass 19 and its valve 18 may be omitted if desired.

In the alternative form of the sealed filter package illustrated in Figs. 5 and 6, the head 31 of the container 32 is recessed for the reception of a disc or plate 33 of fibre or metal, which is secured thereto by the threaded studs 34 of unequal diameter and peened over at their inner ends 35. Before plate 33 is secured to head 31, the filter bag 36 is riveted securely thereto by a grommet 37, which also serves as the inlet passage for the bag. A second opening 38 is provided in plate 33. This opening 38 and the center of grommet 37 register with corresponding dents 40 and 39 in the head 31 serving as openable seals and adapted to be punctured by a suitable tool when the filter is to be placed in commission. A by-pass 41 normally closed by ball valve 42 is inserted in the wall of the filter bag 36 if desired.

Constructed to register with perforations 39 and 40 are passages 43 and 44, respectively, in bed plate 45, leading to respective oil inlet and outlet pipes 46 and 47. Bed plate 45 is provided with openings to receive studs 34, and these openings are of different sizes to accommodate the corresponding stud 34, so that the bed plate 45 and container 32 can only be joined in one way, whereby registry of passages 43 and 44 with respective perforations 39 and 40 is assured. A gasket 48 provided with holes for studs 34 and openings registering with passages 43 and 44, seals the joint between bed plate 45 and the container 32 when nuts 49 are tightened on studs 34. A bracket or clamp 50 on the dash, engine block or the like supports the weight of the container 32. The operation in use of this alternative form of the filter package will be readily understood from the foregoing description of the form illustrated in Figs. 1 to 4, inclusive.

It will be seen that with the filter bag rated at from one to two thousand miles of use, at which time the oil in the engine crank-case should also be renewed the filter acts as a gage to enable the oil service agency or the operator to accurately determine the time for renewal of the oil and the filter, so that the entire oiling system contains fresh oil to insure perfect lubrication of the bearings for the rated period of effectiveness of the oil. On a sticker or the like on the filter container, the operator or the service agency attendant may note the mileage at the time that the oil is changed and thereafter checks that mileage against the speedometer reading from time to time until the rated mileage capacity of the filter is reached, when the oil should be changed. For example, if the oil to be used is rated as an effective lubricant for one thousand miles of operation of the average automobile, the filter is provided with an effective filtering capacity of one thousand miles of operation of the vehicle, so that both the oil and the filter must be changed at the same time.

The increased cost of the new oil filter package is so little greater than the cost of the conventional sealed oil package, that the cost to the consumer is scarcely more than the cost of the oil contained therein and the difference in cost may be absorbed by the oil agency. In comparison, unless the usual filters are renewed when the crank case oil is changed, the quart or more of unclean oil therein pollutes the new oil when it is pumped from the filter upon reoperation of the engine, and, because the usual filters are commonly operated long after they are clogged there is danger of bursting of the filter bag with consequent pollution of the entire oiling system.

It is apparent, therefore, that this invention affords many important advantages, and while several preferred embodiments thereof have been illustrated and described herein, it is to be understood that the invention is not limited thereby but is susceptible to changes in form and detail within its scope. Also, although the invention has been specified as especially adapted for use on automobile engines, it will be understood that it may be used with equal facility in motorboat, aeroplane, railroad and other engines or machines. Furthermore, although the filter element has been illustrated and described herein as a surface filter made of cloth, it may be a metal screen, edge, depth, or plate filter, or the like, depending upon requirements. The term "pure oil" as employed herein and in the appended claims comprehends not only new oil of commercial grade but also filtered and rectified used oil or other lubricant adapted for the same use.

I claim:

1. In a sealed oil filter package, the combination of a container filled with pure, substantially solid-free lubricating oil, and having an opening, a filter element immersed in the oil in the container and communicating with the opening, and a seal for the opening, whereby the entire package is sealed.

2. In a sealed oil filter package, the combination of a container filled with pure, substantially solid-free lubricating oil, and having inlet and outlet openings, a filter element immersed in the oil in the container and interposed between said openings, and openable seal means for said openings, whereby the entire package is sealed.

3. In a sealed oil filter package, the combination of a container filled with pure, substantially solid-free lubricating oil, said container having a frangible portion, and a filter element immersed in the oil in the container and communicating with said frangible portion, whereby breaking of said frangible portion provides communication from the exterior of the container to the filter element.

4. In a sealed oil filter package, the combination of a container filled with pure substantially solid-free lubricating oil, said container having an openable seal, and a filter element immersed in the oil in the container and communicating with said seal, whereby opening of said seal provides communication from the exterior of the container to the filter element.

5. In a sealed oil filter package, the combination of a container filled with pure, substantially solid-free lubricating oil, a nipple in the wall of the container having an opening for receiving an oil supply member, a filter element immersed in the oil in the container and supported by the nipple and communicating with the opening therein, and an openable seal for the opening, whereby the entire package is sealed.

6. In a sealed oil filter package, the combination of a container filled with pure, substantially solid-free lubricating oil, a nipple in the wall of the container having an inlet and an outlet passage, a filter element immersed in the oil within the container and secured to the nipple with one of the passages thereof communicating with the interior of said element, and an openable seal closing said passages, whereby the entire package is sealed.

7. In a sealed oil filter package, the combination of a container filled with pure, substantially solid-free lubricating oil, said container having a frangible wall, a filter element immersed in the oil within the container and having its opening communicating with said frangible wall, whereby the interior of said element communicates with the exterior of said container upon breaking of said frangible wall.

8. As a new article of manufacture, a hermetically sealed metal container, a pure, substantially solid-free lubricating oil filling therein, and a filter element immersed in the oil in the container and having an opening communicating with a wall of the container, which is adapted to be opened at a designated point opposite the filter element opening for access to the contents and filter element.

ANNA E. FROLANDER.